US010862992B2

(12) United States Patent
Wu et al.

(10) Patent No.: US 10,862,992 B2
(45) Date of Patent: Dec. 8, 2020

(54) RESOURCE CACHE MANAGEMENT METHOD AND SYSTEM AND APPARATUS

(71) Applicant: Alibaba Group Holding Limited, George Town (KY)

(72) Inventors: Fengyuan Wu, Hangzhou (CN); Xianghong Jia, Hangzhou (CN); Wei Ye, Hangzhou (CN); Zhongxiao Yao, Hangzhou (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 16/041,079

(22) Filed: Jul. 20, 2018

(65) Prior Publication Data

US 2019/0124174 A1 Apr. 25, 2019

Related U.S. Application Data

(63) Continuation-in-part of application No. PCT/CN2017/071126, filed on Jan. 13, 2017.

(30) Foreign Application Priority Data

Jan. 22, 2016 (CN) .......................... 2016 1 0045314

(51) Int. Cl.
*H04L 29/08* (2006.01)
*G06F 16/00* (2019.01)
*G06F 16/903* (2019.01)

(52) U.S. Cl.
CPC .......... *H04L 67/2842* (2013.01); *G06F 16/00* (2019.01); *G06F 16/90335* (2019.01)

(58) Field of Classification Search
CPC . H04L 67/2842; G06F 16/00; G06F 16/90335
See application file for complete search history.

(56) References Cited

U.S. PATENT DOCUMENTS

| 6,457,047 | B1* | 9/2002 | Chandra | G06F 16/9574 709/217 |
| 7,093,073 | B2* | 8/2006 | Truty | H04L 29/06 711/118 |
| 8,606,996 | B2 | 12/2013 | Richardson | |
| 9,535,843 | B2* | 1/2017 | Zhuang | G06F 12/0862 |
| 10,075,551 | B1 | 9/2018 | Baldwin et al. | |
| 2003/0084244 | A1 | 5/2003 | Paulraj | |
| 2005/0154837 | A1 | 7/2005 | Keohane | |
| 2009/0182836 | A1* | 7/2009 | Aviles | H04L 41/0893 709/213 |

(Continued)

FOREIGN PATENT DOCUMENTS

| CN | 1585941 A | 2/2005 |
| CN | 103095606 A | 5/2013 |

(Continued)

*Primary Examiner* — Azizul Choudhury
(74) *Attorney, Agent, or Firm* — Van Pelt, Yi & James LLP

(57) ABSTRACT

Embodiments of the present application disclose a method, device, and system for caching data resources or managing cached data resources. The method includes obtaining data resources, the data resources corresponding to an application installed on a terminal, obtaining a resource caching strategy based at least in part on the application to which the data resources belong, and caching the obtained data resources based at least in part on the obtained resource caching strategy.

24 Claims, 7 Drawing Sheets

(56) References Cited

U.S. PATENT DOCUMENTS

| | | | |
|---|---|---|---|
| 2013/0198314 A1 | 8/2013 | Quere | |
| 2014/0149392 A1 | 5/2014 | Wang et al. | |
| 2015/0254088 A1* | 9/2015 | Chou | ............... G06F 3/061 |
| | | | 709/212 |
| 2016/0173634 A1* | 6/2016 | Newton | ............. H04L 67/2842 |
| | | | 709/213 |

FOREIGN PATENT DOCUMENTS

| | | |
|---|---|---|
| CN | 103763371 A | 4/2014 |
| CN | 103905332 A | 7/2014 |
| CN | 104320448 | 1/2015 |
| CN | 104360955 | 2/2015 |
| CN | 104572502 A | 4/2015 |
| CN | 104598394 A | 5/2015 |

\* cited by examiner

RESOURCE CACHE MANAGEMENT METHOD AND SYSTEM AND APPARATUS

CROSS REFERENCE TO OTHER APPLICATIONS

This application is a continuation-in-part of and claims priority to International (PCT) Application No. PCT/CN2017/71126 entitled RESOURCE CACHE MANAGEMENT METHOD AND SYSTEM AND APPARATUS, Jan. 13, 2017 which is incorporated herein by reference for all purposes, which claims priority to China Application No. 201610045314.2 entitled A RESOURCE CACHE MANAGEMENT METHOD, SYSTEM, AND MEANS, filed Jan. 22, 2016 which is incorporated herein by reference for all purposes.

FIELD OF THE INVENTION

The present application relates to a field of communication technology. In particular, the present application relates to a method, system, and device for managing resource cache.

BACKGROUND OF THE INVENTION

As communication technology develops, mobile terminal-based Internet applications (also referred to herein as Internet applications) become ever more prevalent to satisfy diverse and continually growing business needs.

Generally when a user starts (e.g., launches) an Internet application, the Internet application needs to load some data. The data to be loaded by the Internet application generally needs to be downloaded from a network server. For example, a news browsing application needs to load a web page upon starting (e.g., to provide current news articles, etc.). The web page to be loaded can include text, links, pictures, videos, and other multimedia information. The prevalent use of Internet applications and the number of data downloaded and provided by Internet applications generates a high volume of downloads. As a result, loading of data on the terminal (e.g., in the Internet application) can proceed slowly, especially when network conditions are poor. The requirement for the Internet application to obtain data from a server and/or a slow download speed or slow loading speed can have a negative impact on user experience and can even render the Internet application unusable.

To increase application loading speed, the data to be used (e.g., needed) by the Internet application can be cached, and the cached data can be loaded when the Internet application starts. Such a method can improve Internet application loading efficiency. However, mobile terminal memory capacity is limited. Thus, if many Internet applications employ the above method to cache data, the result will be excessive memory consumption, which in turn affects Internet application running efficiency, and thus fails to solve the problem of improving user experience and possibly renders Internet applications unusable.

In view of the above, there is a need to ensure Internet application performance while taking into consideration limitations associated with memory capacity of a terminal, such as a mobile terminal.

BRIEF DESCRIPTION OF THE DRAWINGS

Various embodiments of the invention are disclosed in the following detailed description and the accompanying drawings.

DETAILED DESCRIPTION

Figure 1:
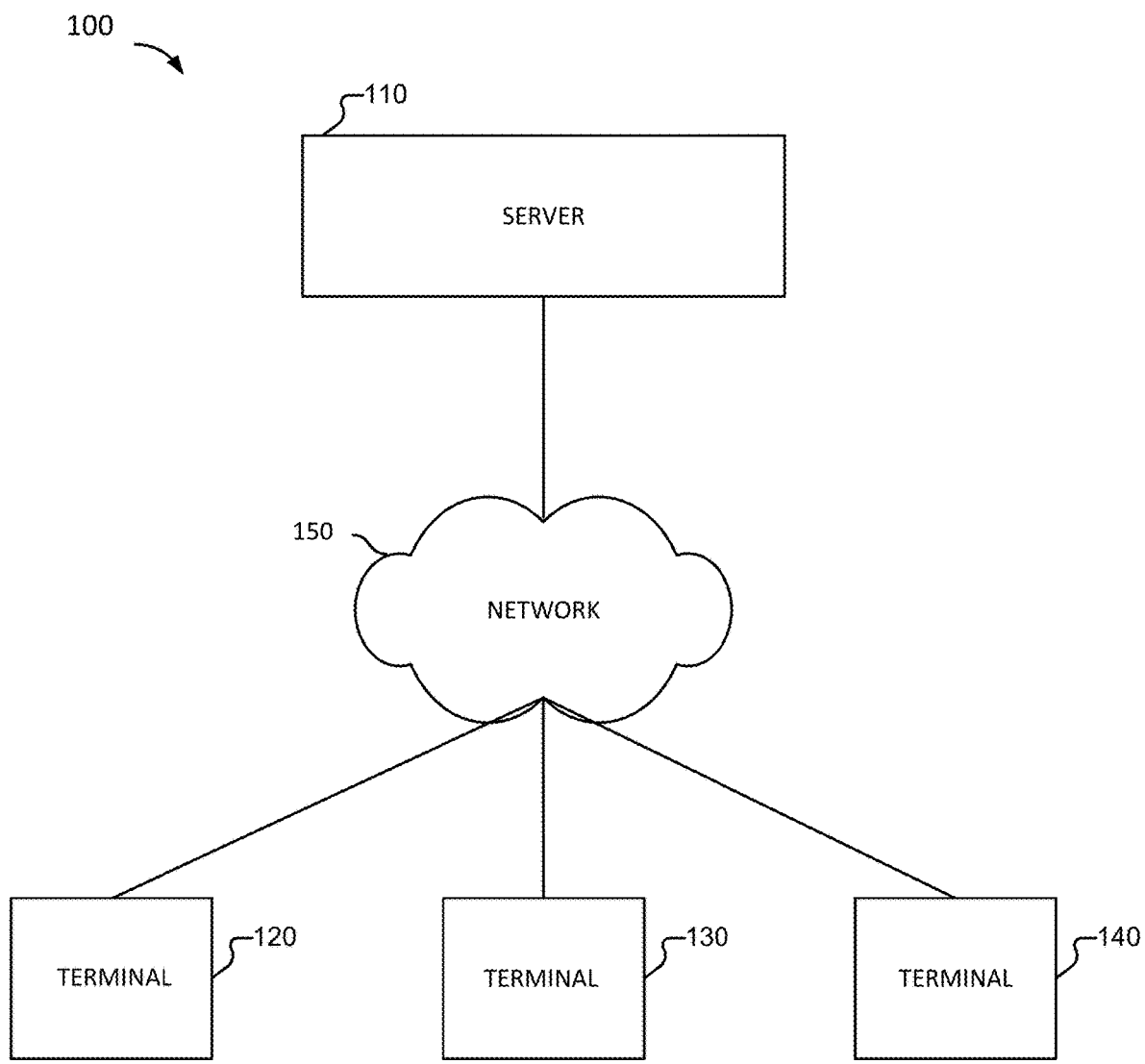
FIG. 1 is a diagram of a system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

In some embodiments, a "smart terminal" is a terminal device having multimedia functions. A smart terminal supports audio, video, data, and other such functions. The smart terminal can have a touchscreen. The smart terminal can correspond to a smart mobile device such as a smart phone, a tablet computer, or a smart wearable device, or a smart television, personal computer, or other such device with a touchscreen. Various operating systems such as Android, iOS, YunOS, and tvOS can be implemented on the smart terminal. Various embodiments discussed herein are in the context of the example of a television device using tvOS; however, other types of terminals or operating systems can be used. A smart terminal can be connected to one or more networks such as the Internet, a WiFi network, a Local Area Network (LAN), a Wide Area Network (WAN), a telecommunications network, etc.

A smart terminal can be connected to one or more peripherals (e.g., smart peripherals). For example, the smart terminal can be connected to one or more peripherals via a Bluetooth connection, a WiFi direct connection, an infrared connection, a ZigBee connection, a Bluetooth Low Energy (BLE) connection, a WiMax connection, a Low Power Radio (LPR) connection, a Near Field Communications (NFC) connection, etc.

FIG. 1 is a diagram of a system according to various embodiments of the present application.

Referring to FIG. 1, system 100 for caching resources is provided. System 100 can implement process 200 of FIG. 200, interface 300 of FIG. 3A, interface 350 of FIG. 3B, system 400 of FIG. 4, system 500 of FIG. 5, terminal 600 of FIG. 6, and/or computer system 700 of FIG. 7.

As illustrated in FIG. 1, system 100 comprises server 110 and one or more terminals 120-140. Server 110 can communicate with one or more terminals 120-140. For example, server 110 can communicate with at least one of one or more terminals 120-140 via one or more networks 150. One or more networks 150 can include a wired network (e.g., a Local Area Network (LAN)), a wireless network (e.g., WiFi, a Wide Area Network (WAN), a cellular network, etc.), or a combination of a wired network and a wireless network. In some embodiments, server 110 corresponds to one or more servers such as an application server, a storage server, etc. Server 110 can be an application server, etc. Server 110 can provide one or more services to the application such as a location-based service, a news service, a game service, etc.

According to various embodiments, terminals 120-140 have one or more applications installed thereon. For example, a terminal (e.g., one or more of terminals 120-140) can have Internet application client programs installed thereon. An Internet application client program corresponds to an application that runs on a terminal and obtains data from a server (e.g., via a network) to provide information to a user or to provide a service to a user. In some embodiments, server 110 has one or more Internet application server programs installed thereon. According to various embodiments, a terminal has an Internet application client program installed thereon and the server has a corresponding Internet application server program installed thereon. An Internet application client program can correspond to an Internet application server program. For example, the Internet application client program can communicate with a corresponding Internet application server program. The one or more terminals 120-140 and server 110 cooperate, and the data resources needed for Internet applications are acquired from server 110 in order to implement the services provided by the Internet applications.

An Internet application client program corresponds to an application that runs on a terminal and obtains data from a server (e.g., via a network) to provide information to a user or to provide a service to a user. Examples of an internet application client program including but not limited to a browser, a weather application, a news application, a video providing application (e.g., Netflix®, Hulu®, etc.), a dating application, a social networking application, a video game application, a map navigational application, etc. As used herein, an Internet application client program can also be referred to an Internet application.

Terminals 120-140 and server 110 (e.g., the application server) can exchange information via network 150. Network 150 can be a WAN, a LAN, or the Internet, the Internet making use of mobile communication technology. One or more of terminals 120-140 can wirelessly access the Internet 150. Server 110 generally is connected to the Internet via one or more cables.

In some embodiments, terminals 120-140, server 110, or both employ cloud computing technology and implement information processing using powerful functions based on cloud computing technology. Server 110 and terminals 120-140 can employ a cloud computing technology-based operating system such as YunOS and thus integrate cloud and terminal resources and services.

According to various embodiments, resource caching strategies are pre-allocated. For example, allocation of the resource caching strategies (e.g., schemes) is determined in advance (e.g., of a request for data from the terminal communicated to the server, of a transaction between the terminal and the server, of data being communicated from the server to the terminal, contemporaneous or in connection with installation or configuration of a corresponding application, etc.). For example, resource caching strategies can be pre-allocated to applications (e.g., Internet applications).

Various embodiments include a plurality of resource caching strategies. For example, a number of defined resource caching strategies can be represented by N, where N is an integer greater than 1. An application (e.g., an Internet application) can have one of the N caching strategies allocated thereto. For example, the server 110 and/or the terminal can store an indication of a resource caching strategy that is to be used in connection with the caching of the resource or the obtaining of data for an application. In some embodiments, a resource caching strategy is mapped to an application. For example, server 110 and/or the terminal can store a mapping of allocated resource caching strategies to corresponding applications (e.g., installed on a terminal, or a server). The mapping can comprise a mapping of an identifier of a resource mapping strategy to an identifier of an application. A resource caching strategy can be mapped to a plurality of applications (e.g., a plurality of applications can use the same resource caching strategy). In some embodiments, a terminal can be configured such that all applications running thereon (that use data caching)

implement a resource caching strategy. In some embodiments, a terminal can be configured to set the resource caching strategy on an application-by-application basis. A user of the terminal, an administrator of a terminal, an administrator of a service, an application developer, etc. can set the resource caching strategy (e.g., to be allocated to an application).

A resource caching strategy can correspond to one or more configurations for caching resources. The resource caching strategy can be indicated based on a flag or bit data (e.g., 2 bit data, etc.). The corresponding resource caching strategy can be called or identified using the flag or bit data (e.g., based on a mapping of identifiers to resource caching strategies). For example, the resource caching strategy corresponds to a process for caching a resource. As another example, the resource caching strategy identifies one or more criteria according to which (e.g., upon the satisfaction of which) a resource is to be cached. As another example, the resource caching strategy can correspond to a location at which a resource is to be cached. The one or more configurations for caching resources can be comprised in the resource caching strategy, or can be associated with the resource caching strategy. For example, in response to determining a resource caching strategy (e.g., by an identifier, etc.), the corresponding one or more configurations can be looked up (or otherwise determined) based on the resource caching strategy. As another example, a mapping of one or more configurations for caching resources to resource caching strategies can be stored (e.g., at a terminal, a server, a data library, etc.). As another example, the resource caching strategy indicates a length of time for which a data resource is to be cached. As another example, the resource caching strategy indicates a data retention policy for data resources in the cache (e.g., a FIFO policy, a LIFO policy, etc.). As another example, the resource caching strategy indicates a threshold amount of data resources to be cached.

In some embodiments, a terminal has a default resource caching strategy according to which data is cached (e.g., in the absence of an application having a pre-allocated caching strategy).

In some embodiments, a terminal implements the resource caching strategy corresponding to an application in connection with using the application (or the application obtaining data). For example, in connection with (e.g., after) data resources being received by the terminal (e.g., by an application on the terminal), the application to which the received data resources belong serves as a basis to determine a resource caching strategy corresponding to the application. The received data resources are cached (e.g., on the terminal) based at least in part on the resource caching strategy corresponding to the application. For example, in response to the terminal receiving the data resources, the terminal caches the data resources according to the resource caching strategy pre-allocated for the application for which the data resources are allocated.

The data resources of one application can correspond to the data and/or programs required to run the corresponding application. For example, in the case of one page of a news browsing application, data resources of the news browsing application can comprise the navigation bar on the page, a picture on the page, the JavaScript code used by the page, and the CSS (Cascading Style Sheets) files used by the page.

Figure 2:
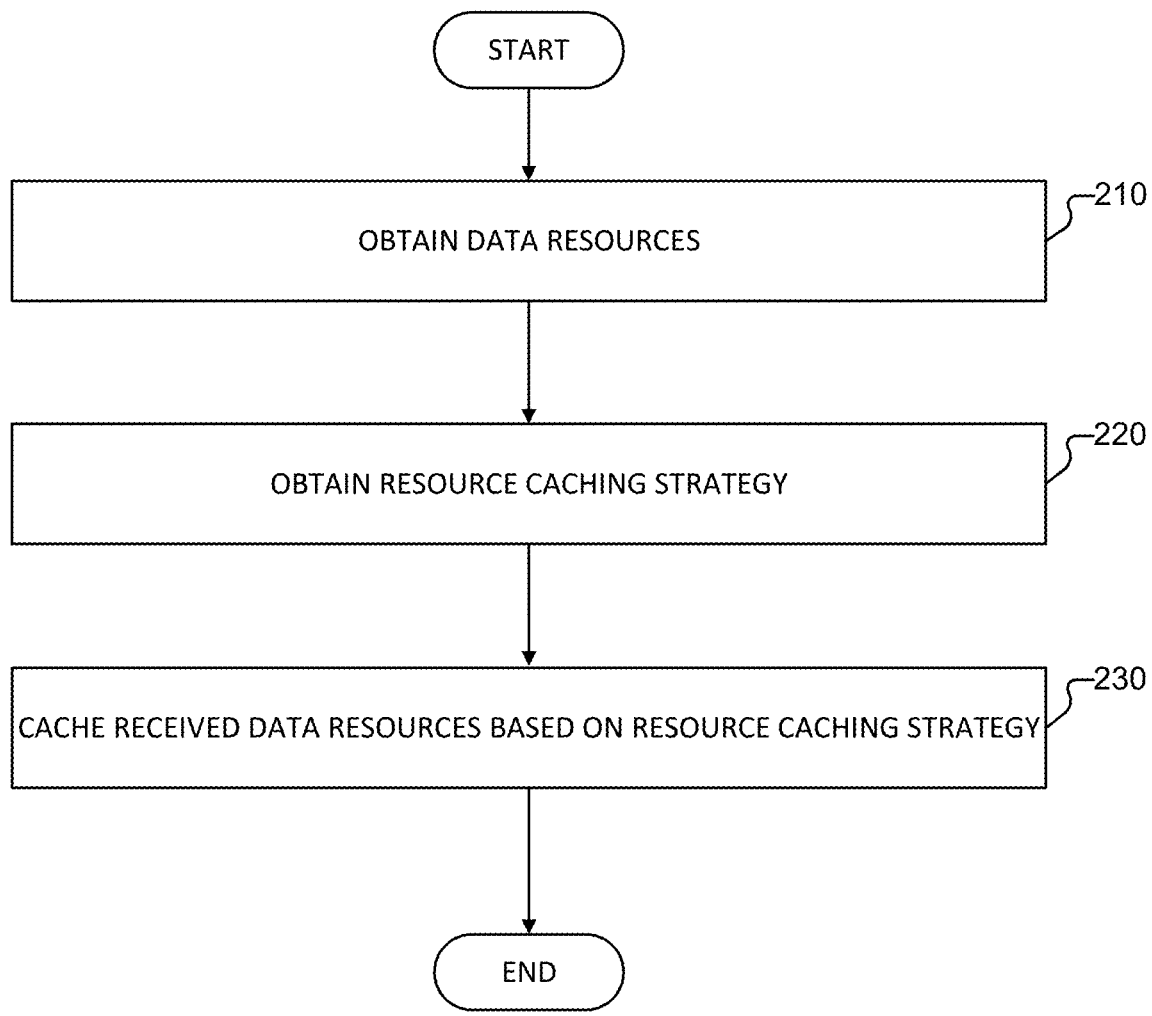
FIG. 2 is a flowchart of a method for resource cache management according to various embodiments of the present application.

FIG. 2 is a flowchart of a method for resource cache management according to various embodiments of the present application.

Referring to FIG. 2, process 200 for resource cache management is provided. Process 200 can implement at least part of interface 300 of FIG. 3A and/or interface 350 of FIG. 3B. Process 200 can be implemented at least in part by system 100 of FIG. 1, system 400 of FIG. 4, system 500 of FIG. 5, terminal 600 of FIG. 6, and/or computer system 700 of FIG. 7.

According to various embodiments, a mobile terminal performs process 200.

At 210, data resources are obtained. In some embodiments, the terminal obtains the data resources. The terminal can obtain the data resources from one or more servers. For example, the one or more servers correspond to one or more application servers that provide information and/or services to the terminal (e.g., to one or more applications running on the terminal). In some embodiments, the data resources are communicated to an Internet application client program from (or at the instruction of) an Internet application server program.

The data resources can correspond to information and/or data to be used in connection with one or more applications (e.g., running on the terminal). The one or more applications can be an internet application. Examples of the one or more applications include, without limitation, a browser, a weather application, a news application, a video providing application (e.g., Netflix®, Hulu®, etc.), a dating application, a video game application, a map navigational application, etc. The one or more applications can communicate with one or more corresponding servers.

The data resources of one application can correspond to the data and/or programs required to run the corresponding application. For example, in the case of one page of a news browsing application, data resources of the news browsing application can comprise the navigation bar on the page, a picture on the page, the JavaScript code used by the page, and the CSS (Cascading Style Sheets) files used by the page.

The data resources can comprise one or more of video information, text information, images, etc. For example, in the case of a news application, the data resources can correspond to an article or video (e.g., associated with current news).

As another example, in the case of a video service application, the data resources can correspond to a video (e.g., to be streamed), title information, production information, images, etc. The data resources can be provided to the video service application in connection with streaming a video, in connection with browsing titles, etc.

As another example, in the case of a dating application, the data resources can correspond to images, text, etc. The data resources can be provided to the dating application in connection with a browsing of matches, a configuration of a profile, a search for a person, etc.

In some embodiments, the data resources are obtained in connection with a request for information, a request for the data resources, etc. For example, the terminal can communicate a request for information (e.g., corresponding to the data resources) to the server, and in response to receiving the request for information, the server determines one or more data resources corresponding to the request for information (e.g., based at least in part on the request for information), and provides the one or more data resources to the terminal (e.g., to the corresponding application running on the terminal). The data resources can be obtained in response to a determination that the corresponding data resources are not stored locally at the terminal. Accordingly, the data resources can be obtained from a server or another terminal or device. In some embodiments, the server pushes the data resources. For example, the server can push the data resources in response to a determination that one or more criteria has been satisfied.

In some embodiments, the server pushes the one or more data resources to the application. For example, the server communicates data resources to the terminal (e.g., the application) according to a predetermined schedule (e.g., based on a predefined period of time, etc.). As another example, the server communicates data resources to the terminal in response to a determination that one or more contexts are satisfied (e.g., in response to one or more criteria being satisfied). The one or more contexts can correspond to a location-based context, a time-based context, a precondition associated with a status of a user of the terminal, etc.

At 220, a resource caching strategy is obtained. In some embodiments, the terminal obtains the resource caching strategy. The resource caching strategy can be obtained based at least in part on the obtained data resources. As an example, the resource caching strategy can be determined based at least in part on an application to which the data resources belong.

The application to which the data resources belong can be determined based at least in part on a request for the data resources. For example, the request for the data resources can comprise an identifier associated with the application to which the data resources belong, an identifier associated with the application that issued (e.g., generated, communicated, etc.) the request for data resources, header information corresponding to the application that issued the request for data resources, etc.

The application to which the data resources belong can be determined based on a type of data resources that are obtained. For example, a data resource corresponding to a video can be deemed to belong to a certain application (e.g., a video providing application), etc. As another example, a data resource corresponding to a web page can be deemed to belong to a browser application.

In some embodiments, the resource caching strategy is determined based at least in part on a mapping of a type of data resources to applications, a mapping of a type of data resources to resource caching strategies, etc. The mapping can be stored locally at the terminal, remotely at a server, in a remote storage, etc. For example, the mapping can be accessible to the terminal via one or more networks. As another example, the terminal can query a server for the resource caching strategy (e.g., such as a request to look up a resource caching strategy corresponding to an application, to a data resource, etc.).

The resource caching strategy can be obtained based on a configuration of the resource caching strategy to be applied for the terminal, to be applied for an application (e.g., an application running on the terminal, an application that obtained the data resources, etc.), to be applied to a type of data resource, etc. The resource caching strategy can be preset (e.g., in advance of process 200) based on user preferences or settings, administrator preferences or settings, application settings, etc. The resource caching strategy can correspond to a resource caching strategy that corresponds to a default resource caching strategy set for the terminal, an application, a type of data resource, etc.

At 230, the data resources are cached based at least in part on the resource caching strategy. In some embodiments, the terminal caches the data resources based at least in part on the resource caching strategy. The data resources can be cached locally at the terminal.

Various embodiments provide three resource caching strategies described further below. Other resource caching strategies are possible.

First resource caching strategy: according to the first resource caching strategy, all data resources for the corresponding application are cached. For example, in response to obtaining data resources and determining that the first resource caching strategy is to be applied with respect to the obtained data resources, the obtained data resources are cached. In some embodiments, if the cache memory is full then the first resource caching strategy fails, but if the sufficient cache memory is available, then the cache management module releases and retrieves lower priority cache memory section to allocate to such cache memory resource Second resource caching strategy: according to the first resource caching strategy, data resources of a designated portion of the application are cached. As an example, the designated portion of the application can correspond to a partial page content of a web page. The designated portion of the application can be defined by one or more of the server, an operating system, an application, a user of the terminal, an administrator, etc. The second resource caching strategy can be used in connection with defining partial page content of a cached web page or one or a combination of public files used by a web page.

Third resource caching strategy: according to the third resource caching strategy, initially received data resources of the application following each start of the application are cached. For example, according to the third resource caching strategy, a preset amount of data resources obtained in response to launching the application is cached. The initially received data resources can be determined based on data resources that are obtained (e.g., communicated by the server) in response to a query for initial data resources that is sent upon (e.g., in response to) launch of the application.

In some embodiments, the term "initially received data resources" refers to data resources are received by an application for a first time. For example, initially received data resources comprise the data resources are new to the application. As another example, if the application already has the data resources, then data resources are not deemed to be initially received data resources.

In some embodiments, resource caching strategies are pre-allocated. The resource caching server can be sent to the terminal by the server or set by the user as necessary. According to various embodiments, resource caching strategies are updated. The resource caching strategies can be updated according to a predefined threshold time (e.g., an update frequency), one or more conditions, a request of a user or an administrator, etc. The resource caching strategies can be updated in response to an update to an application, etc. As an example, the server sends updated resource caching strategies to the terminal. As another example, a user can set or modify resource caching strategies through a provided resource caching strategy setting interface. In the case of a server sending resource caching strategies to a terminal, the server can send a resource cache allocation command to a terminal. In some embodiments, the server sends the resource cache allocation command to a terminal in response to a determination that a caching strategy is sent by the server. In embodiments, the resource allocation command comprises the resource caching strategy. The resource allocation command can correspond to a command for the terminal to invoke the resource caching strategy. The resource cache allocation command can indicate a resource caching strategy to be implemented (e.g., allocated to or adopted by an application, a command for resource caching to be implemented, etc.). In response to receiving the resource cache allocation command, the terminal implements resource caching and the resource caching strategy to be used in the resource caching that is to be implemented. As an example, the resource cache allocation command causes the terminal to implement resource caching according to a predefined or identified resource caching strategy.

In connection with allocation of a resource caching strategy to an application, the resource caching strategy therefore can be allocated to the application on the basis of one or a combination of: the application category, a type of application, data resource consumption, and use frequency. For example, the third resource caching strategy can be set up for (e.g., allocated to) an application, such as a news browsing application, that loads relatively large amounts of data (e.g., current news items) when started (e.g., launched). The loading of the data in the application at a time when the application is launched, and a caching of such information can reduce delays in obtaining data resources at each start and improve loading efficiency. As another example, the second resource caching strategy is set up for an application with a relatively large amount of data resources. An example of an application with a relatively large amount of data resources can comprise a video streaming application, a video game, etc. In addition to reducing delays in obtaining data resources, the use of the second resource caching strategy to cache data resources for such an application avoids the case of data resources occupying too much memory. As another example, the first resource caching strategy is set up for an application with a high use frequency (e.g., an application regularly used by the user) so that all the data resources of the application are cached in order to meet the operating needs of the user and reduce delays in obtaining data resources. According to various embodiments, combinations of the various aforesaid deciding factors which are considered in connection with setting resource caching strategies can be used in connection with allocating a resource caching strategy with a context or with an application. Various other criteria can be used in connection with allocating a resource caching strategy with a context or with an application.

In some embodiments, resource caching strategies are allocated to applications according to one or more predefined allocating rules. As an example, an allocating rule can establish correspondences between application types and resource caching strategies. As another example, an allocating rule can establish conditions corresponding to different resource caching strategies. The allocating rule can define a data resource consumption threshold. As an example, according to such an allocating rule, in the event that (e.g., in response to a determination that) the data resource consumption of an application is greater than a data resource consumption threshold, the second resource caching strategy is allocated for the application (e.g., the application is set to use the second resource caching strategy in connection with caching resources to be used in connection with the application). The network side can send updated allocating rules to the terminal. A user or an administrator can change, update, or otherwise modify an allocating rule. For example, to meet the personalized needs of the user, the user can (e.g., manually) set the allocating rules or the user can set resource caching strategies for applications.

Figures 3A, 3B:
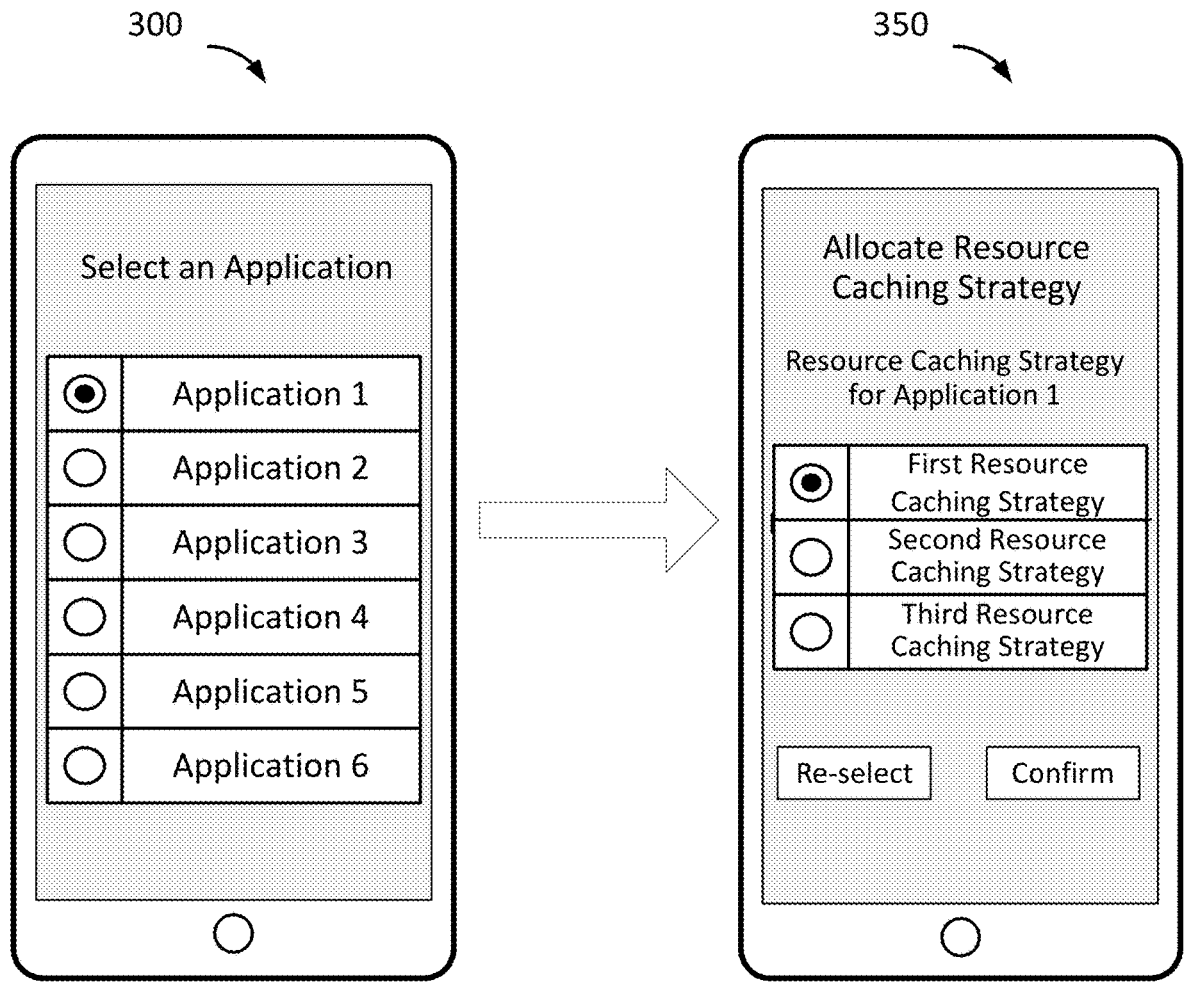
FIG. 3A is a diagram of an interface for setting a resource caching strategy according to various embodiments of the present application.
FIG. 3B is a diagram of an interface for setting a resource caching strategy according to various embodiments of the present application.

FIG. 3A is a diagram of an interface for setting a resource caching strategy according to various embodiments of the present application. FIG. 3B is a diagram of an interface for setting a resource caching strategy according to various embodiments of the present application.

Referring to FIG. 3A, interface 300 for setting a resource caching strategy is provided. Interface 300 can be implemented in connection with process 200 of FIG. 2. Interface 300 can be implemented at least in part by system 100 of FIG. 1, system 400 of FIG. 4, system 500 of FIG. 5, terminal 600 of FIG. 6, and/or computer system 700 of FIG. 7. Interface 300 can be implemented in connection with interface 350 of FIG. 3B.

Interface 300 can be provided by a terminal. For example, the terminal can display interface 300 on a display (e.g., a touchscreen) of the terminal. Interface 300 is provided in connection with setting resource caching strategies. For example, interface 300 can be provided to identify an application to be associated (e.g., allocated) with a resource caching strategy. A user can input a selection to interface 300. For example, a user can select one or more applications with which to associate a resource caching strategy. In some embodiments, the terminal can provide all applications installed on the terminal on interface 300. In some embodiments, the terminal provides a subset of applications installed on the terminal on interface 300. For example, interface 300 displays one or more applications corresponding to a certain type of application. Interface 300 can be invoked based on selection of a type of applications, and in response to the selection of the type of applications, the corresponding one or more applications can be provided on interface 300.

According to various embodiments, interface 300 is provided in connection with the process of a user making use of a setting interface provided by a resource cache management system to set a resource caching strategy for an application. As illustrated in interface 300 (e.g., the "Select an Application" interface), the user can select an application for which a resource caching strategy is to be set. In response to the selection of one or more applications (e.g., for which a resource caching strategy is to be set) on interface 300, interface 350 of FIG. 3B can be provided.

Referring to FIG. 3B, interface 350 for setting a resource caching strategy is provided. Interface 350 can be implemented in connection with process 200 of FIG. 2. Interface 350 can be implemented at least in part by system 100 of FIG. 1, system 400 of FIG. 4, system 500 of FIG. 5, terminal 600 of FIG. 6, and/or computer system 700 of FIG. 7. Interface 350 can be implemented in connection with interface 300 of FIG. 3A.

Interface 350 can be provided by a terminal. For example, the terminal can display interface 350 on a display (e.g., a touchscreen) of the terminal. Interface 350 is provided in connection with setting resource caching strategies. For example, interface 350 can be provided to identify one or more resource caching strategies that can be set for (e.g., in association with) an application. A user can input a selection to interface 350. For example, a user can select one or more resource caching strategies to associate with one or more applications. In some embodiments, the terminal can provide all resource caching strategies available on the terminal on interface 350 (e.g., all resource caching strategies available for association). In some embodiments, the terminal provides a subset of resource caching strategies available on the terminal on interface 350. For example, interface 350 displays one or more resource caching strategies corresponding to a certain type of applications. Interface 350 can display one or more caching strategies available for association with the one or more applications selected on interface 300 of FIG. 3A.

In some embodiments, the terminal is caused to display interface 350 based on selection of one or more applications from interface 300 of FIG. 3A. For example, in response to selection of the one or more applications from interface 300 of FIG. 3A, the terminal invokes interface 350 to display one or more resource caching strategies to be set for such one or more applications.

The user can input to interface 350 in connection with selecting a resource caching strategy for the corresponding application (e.g., the application selected at interface 300).

In some embodiments, the data resource caching strategies corresponding to the applications are updated based on status changes of the applications. Application status changes can include one or a combination of: change in application use frequency, change in data resource consumption needed by the application, etc. Data resource caching strategies and updating the data resource caching strategies can better meet user application operating needs while balancing application performance and memory use.

For better balancing of application performance and memory use, a cache capacity upper limit for data resources can be configured (e.g., set). Accordingly, after data resources are received, the allocated data resource upper cache capacity limit can serve as a basis to determine whether the data volume of currently cached data resources has reached the upper cache capacity limit. In response to a determination that the upper cache capacity limit has not been exceeded or will not be exceeded by caching the obtained data resources, the received data resources are cached according to the corresponding resource caching strategy. In response to a determination that the upper cache capacity limit has been exceed or will be exceeded in connection with caching the obtained data resources, the received data resources will not be cached, or, a set of data resources in the cache can be released to cache the received data resources according to the corresponding resource caching strategy, etc.

In some embodiments, received data resources are not cached (or no longer cached) in response to a determination that the data volume of the currently cached data resources has reached the upper cache capacity limit. Accordingly, limiting the caching of received data resources can avoid excessive consumption of terminal memory. In some embodiments, in response to a determination that the data volume of the currently cached data resources has reached the upper cache capacity limit, then, after, a portion of cached data resources is released. As an example, the portion of cached data resources that is released (e.g., in response to a threshold limit of cached data resources having been reached) can be determined according to how long respective data resources have been cached. As an example, the portion of cached data resources that is released (e.g., in response to a threshold limit of cached data resources having been reached) can be determined according to a frequency by which the cached data resources are accessed. As an example, the portion of cached data resources that is released (e.g., in response to a threshold limit of cached data resources having been reached) can be determined according to a date on which the respective cached data resources were last accessed or used (e.g., data resources that have an oldest date of last access or use can be released). As an example, the portion of cached data resources that is released (e.g., in response to a threshold limit of cached data resources having been reached) can be determined according to a frequency by which an application corresponding to the respective cached data resource is used. As an example, the portion of cached data resources that is released (e.g., in response to a threshold limit of cached data resources having been reached) can be determined according to a date on which the respective application corresponding to each cached data resource was last used or run (e.g., data resources for which a corresponding application has not been executed in a long time are released). Other criteria for determining the cached data resources to release can be implemented. In some embodiments, server, operating system, and/or user can set a priority of cached data. The priority of cached data can be used in connection with determining cached data resources to be released (e.g., data resources with a higher priority can be released after data resources with a lower priority). In response to the release of the cached data resources, the received data resources are cached according to the determined resource caching strategy. In addition to avoiding excessive consumption of terminal memory, limiting the caching of data resources and/or releasing currently cached data resources of some applications, and caching data resources of one or more applications balances application performance and memory (e.g., memory limitations).

According to various embodiments, in response to receiving application data resources, the application to which the data resources belong serves as a basis to determine and/or obtain a resource caching strategy corresponding to the application. The received data resources are cached according to the determined and/or obtained resource caching strategy. Pre-allocating resource caching strategies to applications is possible. As an example, the resource caching strategy allocated to one application can be one of N resource caching strategies, where N is a positive integer. As another example, one or more resource caching strategies are allocated to an application (e.g., different resource caching strategies can be used in connection with data resources for one application based on a context such as a context of the terminal, etc.). Allocating different resource caching strategies to different applications according to requirements or contexts is possible. For example, all the data resources of an application can be cached, or a portion of the data resources of an application can be cached. In some embodiments, the initially obtained data resources are cached. Other data resources that are obtained in connection with an application can be released (e.g., not cached). Thus, in-terminal memory consumption is taken into account while ensuring application running performance.

In some embodiments, historical information (e.g., performance data, data resource consumption, data resource caching, etc.) and/or statistical information on network status and/or device running status is collected and stored. The historical information and/or statistical information can be stored locally at the terminal or at the server. Network status information can include one or any combination of the following: network connection type (e.g., wireless area network connection or cellular network connection), uplink/downlink transmission rate, packet loss rate, or network status level determined according to the above information. As an example, network status level includes: a good status, a poor status, a very poor status, etc. The network status level can be determined in connection with one or more measurements of a network connection as compared to one or more thresholds. Device running status information includes one or any combination of the following: available capacity of device memory, CPU occupancy, or device status determined according to the above information. As an example, device status level may include: a tight memory status, a good memory status, an idle memory status, etc. The device status level can be determined in connection with one or more measurements pertaining to memory (e.g., a use of memory such as local memory on the terminal, etc.) as compared to one or more thresholds.

According to various embodiments, cache management strategies (e.g., resource cache strategies) are allocated and cached data resources are managed, and/or caching operations are controlled based at least in part on the allocated cache management strategies, and network statuses and/or device running statuses.

In some embodiments, managing cached data resources includes performing one or more management operations with respect to one or more cached data resources. Management operations with respect to one or more cached data resources include a first releasing operation, a second releasing operation, and/or a third releasing operation, which are respectively further described below. Other management operations can be implemented.

A first releasing operation: according to the first releasing operation, data resources for corresponding applications which have or correspond to the first resource caching strategy are released. As an example, for all or some of the applications associated with (e.g., using) the first resource caching strategy to cache data resources, the data resources of those applications are released. The first resource caching strategy can be used in connection with caching data resources. The first resource caching strategy can correspond to a caching of all the data resources of the corresponding one or more applications.

A second releasing operation: according to the second releasing operation, data resources for corresponding applications are released. As an example, for all or some of the applications using the second resource caching strategy to cache data resources, the data resources of those applications are released. The second resource caching strategy can be used in connection with caching data resources. The second resource caching strategy can correspond to a caching of a portion (e.g., a subset) of the data resources of the corresponding one or more applications.

A third releasing operation: according to the third releasing operation, data resources for corresponding applications are released. As an example, for all or some of the applications using the third resource caching strategy to cache data resources, the data resources of those applications are released. The third resource caching strategy can be used in connection with caching initially received data resources of corresponding one or more applications. The third resource caching strategy can correspond to a caching of a portion (e.g., a subset) of the initially received data resources of the corresponding one or more applications.

According to various embodiments, cached data resources are released if memory resources are tight (e.g., available memory capacity is lower than a set threshold). Releasing a cached data resource can correspond to removing (e.g., deleting or otherwise flushing the corresponding data resource from the cache).

Control of caching operations may include, but is not limited to, (i) ending or resuming use of the first resource caching strategy to cache data resources, (ii) ending or resuming use of the second resource caching strategy to cache data resources, (iii) ending or resuming use of the third resource caching strategy to cache data resources, etc.

As an example, if memory resources are tight (e.g., available memory capacity is lower than a set threshold), then the caching of data resources can be stopped. The caching of data resources can be stopped by turning off the caching module. The caching module can be turned off based at least in part on an operating system of the terminal stopping the function or calling of the function or module. For example, data resources can be re-directed from the caching module. As another example, the terminal can be configured to stop caching the data resources by configuring the terminal to not implement the corresponding resource caching strategy. In some embodiments, in response to the memory resource status reverting from tight (e.g., from limited available memory) back to normal (e.g., available memory capacity being equal to or greater than a set threshold), the data resource can be cached. For example, the caching module is started in connection with the continuing of caching data resources. The terminal can be configured to implement the corresponding resource caching strategy in response to a determination that memory resources are sufficient for caching (e.g., the available memory capacity being equal to or greater than the set threshold).

In some embodiments, cache management levels are determined based at least in part on network status and/or device running status. For example, cached data resources are managed and/or caching operations are controlled by implementing cache management strategies based at least in part on and corresponding to the determined cache management levels.

Three cache management levels are discussed below. Other cache management levels can be implemented.

Level 1: cache management level 1 indicates that relatively little memory capacity is available in the terminal. For example, memory is tight (e.g., available memory capacity is lower than a first set threshold), and a management operation such as releasing data resources is to be performed.

Level 2: cache management level 2 indicates a moderate amount of memory capacity in the terminal. For example, available memory capacity is lower than a second set threshold but equal to or greater than the first set threshold. According to cache management level 3, certain data resources can be released. For example, data resources that have been cached for a longer period of time are released. Some or all cached data resources are released. As an example, a number of cached data resources to be released is preset. As another example, a number of cached data resources to be released is determined based at least in part on an amount of cached data resources and a preset threshold (e.g., a number of cached data resources to be released is determined to be a difference between the current amount of cached data resources and the preset threshold). The preset threshold can be the second set threshold.

Level 3: cache management level 3 indicates that a relatively large amount of memory capacity is available in the terminal. For example, available memory capacity is equal to or greater than the second set threshold. As an example, a cache management level 3 can be indicative that there are no data resources to be released. For example, an operation to release data resources is not performed if the cache management level corresponds to level 3.

Of course, the above definitions of cache management levels are just examples. Embodiments of the present application are not limited to the cache management levels defined above.

The cache management level can determined based at least in part on one or more conditions. As an example, the cache management level is determined to be the highest level (e.g., level 3) if one or a combination of the following conditions is met: available capacity of device memory is less than a set threshold; a device CPU occupancy is higher than a set threshold; an uplink and/or downlink transmission rate is higher than a set threshold; a packet loss rate is lower than a set threshold. Various other conditions can be used in connection with determining a cache management level.

In some embodiments, a resource caching strategy and/or a cache management level is determined based at least in part on a network status and a device running status. As an example, if available device memory capacity is lower than a set threshold, the terminal is currently communicating with the Internet via a wireless area network, and the uplink and/or downlink transmission rate is higher than a set threshold, then terminal memory consumption is determined to be trending upwards. Because current available capacity of terminal memory is already rather low (e.g., because available device memory capacity is lower than the set threshold), management and/or control over data resource caches is to be implemented. For example, cached data resources are released, and/or data resource caching operations are stopped.

In some embodiments, if the cache management level is determined based at least in part on the network status and/or the device running status is determined to be the highest level, then the first releasing operation is executed. Moreover, after the first releasing operation is executed, the terminal determines whether the cache management level corresponds to the highest level based at least in part on the network status and/or device running status. If the cache management level is determined to (continue to) correspond to the highest level, then the second releasing operation and/or the third releasing operation is executed.

In some embodiments, during management of cached data resources, releasing the data resources of the application whose data resources have been cached for the longest time can be given priority (e.g., the corresponding data resources can be released first or before data resources of other applications), or releasing the data resources of the application which has the highest cached data volume can be given priority. In some embodiments, releasing the data resources of the application whose data resources have been cached for the longest time and the application which has the highest cached data volume are given priority. In some embodiments, releasing the data resources of the least recently used application are given priority. Other considerations can be used in connection with allocating a priority for releasing data resources. For example, cache duration, cached data volume, and use frequency can be used in connection with determining when to release cached data resources or in connection with determining a priority for releasing such cached data resources. For example, the terminal first determines applications which have cached data resources for longer periods of time (e.g., greater than a preset threshold period of time, a set of a threshold number of applications having data resources cached for the longest time, etc.), then determines which of the applications having cached resources for longer periods of time that have the largest volume of cached data resources, and then releases data resources for one or more resulting applications (e.g., the applications satisfying both criteria). For example, the terminal first determines applications having larger volumes of cached data (e.g., greater than a preset threshold period of time, a set of a threshold number of applications having data resources cached for the longest time, etc.), then determines which of the applications having cached resources for longer periods of time that have cached data for the longest time, and then releases data resources for one or more resulting applications (e.g., the applications satisfying both criteria).

As an example, if memory is determined to be tight (e.g., available memory capacity is lower than a set threshold), priority may be given to releasing data resources that were cached using the first caching strategy while releasing an appropriate volume of data resources cached using the second caching strategy (e.g., releasing a portion of the data resources cached using the second caching strategy). Release of data resources cached using the third caching strategy (e.g., a cached page sidebar such as a navigation bar, etc.) can be controlled according to an Expire attribute and Cache-Control attribute for such data resources as defined in the HTTP protocol. The Expire attribute can be a unix time stamp (e.g., 1531724936).

According to various embodiments, determining data resources that are to be cached and balancing application performance and memory are possible by using managed cached data resources and/or controlled data resource caching operations based on pre-allocated cache management strategies and (statistically obtained) network statuses and/or device running statuses. The determining of data resources that are to be cached and balancing application performance and memory are possible even when there is relatively little memory capacity available in a terminal (e.g., an available memory capacity for caching data resources that is lower than a set threshold).

Figure 4:
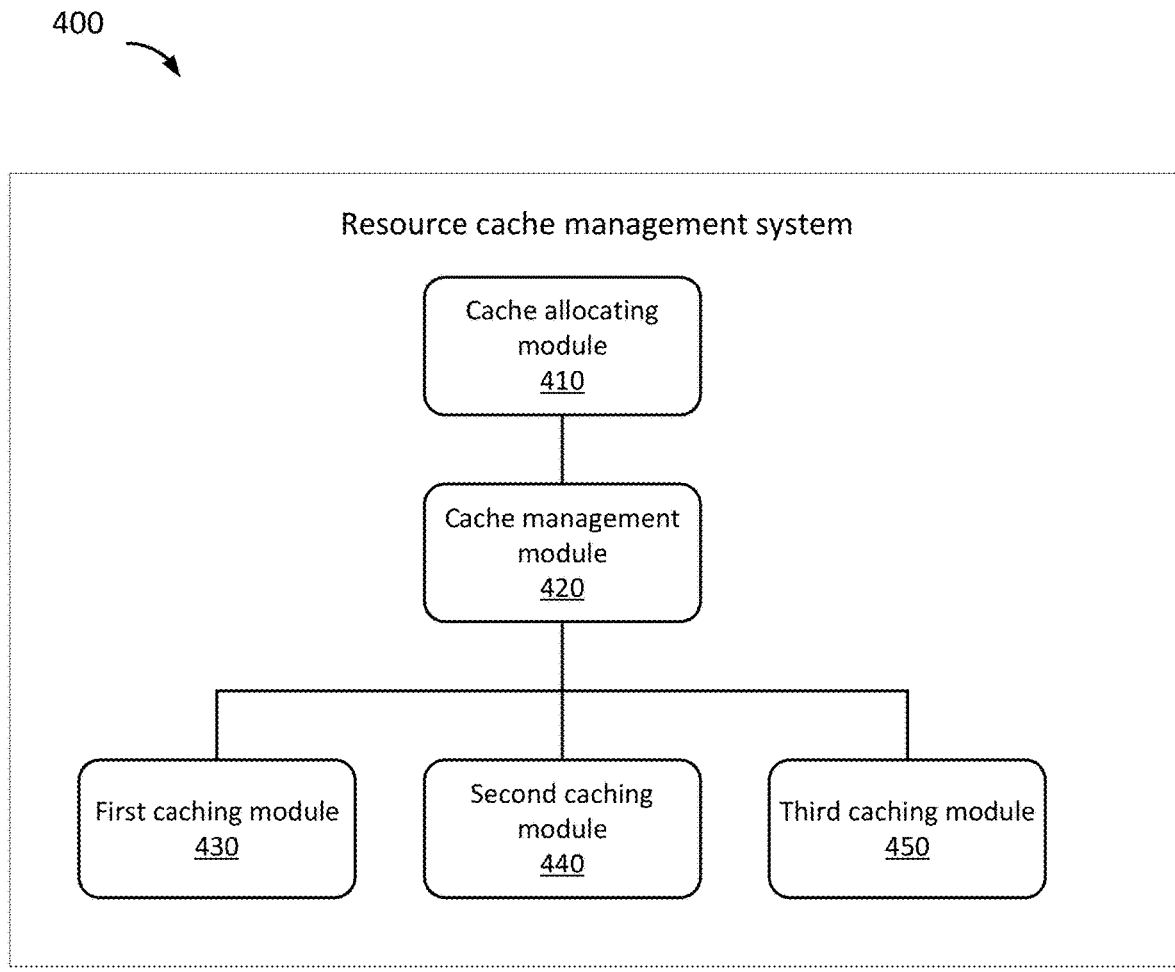
FIG. 4 is a structural diagram of a resource cache management system according to various embodiments of the present application.

FIG. 4 is a structural diagram of a resource cache management system according to various embodiments of the present application.

Referring to FIG. 4, resource cache management system 400 is provided. Resource cache management system 400 can implement at least part of process 200 of FIG. 2, interface 300 of FIG. 3A and/or interface 350 of FIG. 3B. Resource cache management system 400 can be implemented at least in part by system 100 of FIG. 1, system 500 of FIG. 5, terminal 600 of FIG. 6, and/or computer system 700 of FIG. 7.

According to various embodiments, a terminal implements resource cache management system 400. Resource cache management system 400 can be implemented as software, hardware, or a combination of software and hardware.

As illustrated in FIG. 4, resource cache management system 400 comprises cache allocating module 410 and cache management module 420. Resource cache management system 400 can further comprise first caching module 430, second caching module 440, and/or third caching module 450. Resource cache management system 400 can comprise additional caching modules.

First caching module 430, second caching module 440, and/or third caching module 450 can provide a cacheability JS API developed for an application. A resource caching strategy allocating operation can be implemented by calling the JS API. For example, a resource caching strategy can be implemented in connection with calling a corresponding caching module.

Cache allocating module 410 is configured to pre-allocate resource caching strategies to applications. The resource caching strategy allocated to one application can be one of N resource caching strategies.

Cache management module 420 is configured to obtain (e.g., receive) data resources, obtain a resource caching strategy based at least in part on and corresponding to the application to which the data resources belong, and use the acquired resource caching strategy in connection with instructing the corresponding caching module that executes the corresponding resource caching strategy to cache the received data resources.

In some embodiments, cache allocating module 410 is further configured to allocate upper cache capacity limits for data resources. Cache management module 420 can be configured to, after receiving data resources, use the data resource cache capacity allocated by cache allocating module 410 as a basis to determine whether the data volume of currently cached data resources has exceeded an upper cache capacity limit (e.g., is greater than the upper cache capacity limit, or equal to or greater than the upper cache capacity limit). If cache allocating module 410 determines that the data volume of currently cached data resources has not exceeded an upper cache capacity limit, the obtained resource caching strategy can serve as a basis to instruct the corresponding caching module that executes the corresponding resource caching strategy to cache the received data resources.

In some embodiments, cache management module 420 is configured to cease caching data resources (or to instruct a corresponding caching module to cease caching data resources) in response to a determination that the data volume of currently cached data resources exceeds an upper cache capacity limit (e.g., exceeds or is equal to or greater than the upper cache capacity limit). In some embodiments, the caching module that executes the corresponding resource caching strategy is instructed to cache the received data resources according to the obtained resource caching strategy after a portion of cached data resources is released according to how long data resources have been cached.

According to various embodiments, the resource caching strategy corresponds to a first resource caching strategy, a second resource caching strategy, or a third resource caching strategy. Other resource caching strategies are possible.

First resource caching strategy: according to the first resource caching strategy, all data resources for the corresponding application are cached. For example, in response to obtaining data resources and determining that the first resource caching strategy is to be applied with respect to the obtained data resources, the obtained data resources are cached.

Second resource caching strategy: according to the first resource caching strategy, data resources of a designated portion of the application are cached. The second resource caching strategy can be used in connection with defining partial page content of a cached web page or one or a combination of public files used by a web page.

Third resource caching strategy: according to the third resource caching strategy, initially received data resources of the application following each start of the application are cached. For example, according to the third resource caching strategy, a preset amount of data resources obtained in response to launching the application are cached. The initially received data resources can be determined based on data resources that are obtained (e.g., communicated by the server) in response to a query for initial data resources that is sent upon (e.g., in response to) launch of the application.

According to various embodiments, the first caching module 430 implements the first resource caching strategy to cache data resources, the second caching module 440 implements the second resource caching strategy to cache data resources, and the third caching module 450 implements the third resource caching strategy to cache data resources.

According to various embodiments, cache management module 420 is configured to, in response to a determination that the obtained resource caching strategy is the first resource caching strategy, instruct the first caching module 430 to cache data resources. According to various embodiments, cache management module 420 is configured to, in response to a determination that the obtained resource caching strategy is the second resource caching strategy, instruct the second caching module 440 to cache data resources. According to various embodiments, cache management module 420 is configured to, in response to a determination that the obtained resource caching strategy is the third resource caching strategy, instruct the third caching module 450 to cache data resources.

According to various embodiments, the second resource caching strategy is used in connection with defining partial page content of a cached web page or one or a combination of public files used by a web page.

Cache allocating module 410 can be configured to allocate data resource caching strategies to said applications based on one or a combination of: application category, data resource consumption, and use frequency.

Cache allocating module 410 can be configured to update the data resource caching strategies corresponding to the applications based at least in part on status changes of the applications.

Figure 5:
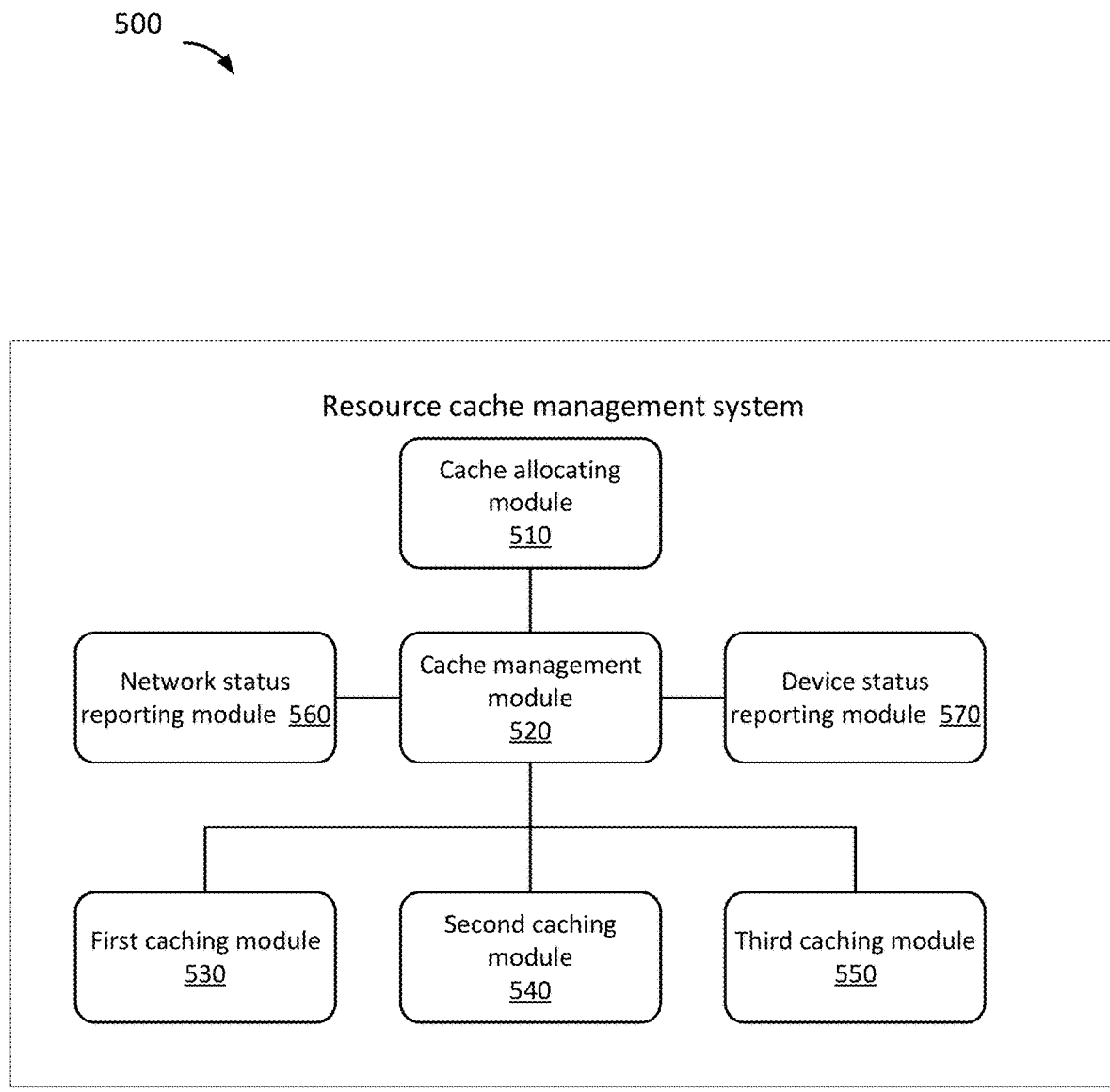
FIG. 5 is a structural diagram of a resource cache management system according to various embodiments of the present application.

FIG. 5 is a structural diagram of a resource cache management system according to various embodiments of the present application.

Referring to FIG. 5, resource cache management system 500 is provided. Resource cache management system 500 can implement at least part of process 200 of FIG. 2, interface 300 of FIG. 3A, and/or interface 350 of FIG. 3B. Resource cache management system 500 can be implemented at least in part by system 100 of FIG. 1, system 400 of FIG. 4, terminal 600 of FIG. 6, and/or computer system 700 of FIG. 7.

According to various embodiments, a terminal implements resource cache management system 500. Resource cache management system 500 can be implemented as software, hardware, or a combination of software and hardware.

As illustrated in FIG. 5, resource cache management system 500 comprises cache allocating module 510 and cache management module 520. Resource cache management system 500 further comprises network status reporting module 560 and/or device status reporting module 570. Resource cache management system 500 can further comprise first caching module 530, second caching module 540, and/or third caching module 550. Resource cache management system 500 can comprise additional caching modules.

Cache allocating module 510 can correspond to cache allocating module 410 of resource cache management system 400 of FIG. 4.

Cache management module 420 can correspond to cache management module 420 of resource cache management system 400 of FIG. 4.

First caching module 530, second caching module 540, and/or third caching module 550 can respectively correspond to first caching module 430, second caching module 440, and/or third caching module 450 of resource cache management system 400 of FIG. 4.

Network status reporting module 560 is configured to collect information pertaining to network status. For example, network status reporting module 560 can collect statistics and reporting network status. Network status reporting module 560 provides the statistics and/or network status to the cache management module 520.

Device status reporting module 570 is configured to collect information pertaining to a device running status. For example, device status reporting module 570 can collect statistics and reporting device running status. Device status reporting module 570 provides the statistics and/or device running status to the cache management module 520.

In some embodiments, cache allocating module 510 is further configured to allocate cache management strategies. Cached data resources are managed and/or caching operations of the corresponding caching module are controlled according to: cache management strategies allocated by the cache allocating module 510, network status reported by network status reporting module 560, and/or device running status reported by device status reporting module 570.

In some embodiments, cache management module 510 is configured to obtain the application associated with the data resources which have been cached for the longest time (e.g., as reported or determined by the corresponding caching module), and/or the application having the largest cached data volume. In some embodiments, cache management module 520 is configured to, in connection with managing cached data resources, prioritize releasing data resources of the application associated with the data resources which have been cached for the longest time and/or the application having the largest cached data volume.

As an example, one or more caching modules can report to the cache management module 520 the application associated with the data resources which have been cached for the longest time and/or the application having the largest cached data volume. For example, first caching module 530 can determine the least recently used application with respect to data resources of each application that are cached using the first resource caching strategy. First cashing module 530 can determine the least recently used application in accordance with the Least Recently Used (LRU) process. The information relating to the least recently used application (e.g., application name or application ID) is provided to cache management module 520. Each caching module can report (e.g., provide information pertaining to the least recently used application) according to a set period of time (e.g., a set frequency, a set interval, and/or a set time). Accordingly, in connection with the cache management module 520 managing cached data resources, cache management module 520 can prioritize releasing the data resources of the application whose data resources have been cached for the longest time, or management module 520 can prioritize releasing the data resources of the application which has the highest cached data volume, or management module 520 can prioritize releasing the data resources of the application whose data resources have been cached for the longest time and the application which has the highest cached data volume, or management module 520 can prioritize releasing the data resources of the least recently used application. According to various embodiments, various other considerations are used in connection with determining a priority (e.g., an order) for releasing cached data resources. For example, such various other considerations include cache duration, cached data volume, and use frequency. For example, in connection with determining which data resources to release, the terminal can determine applications which have cached data resources for longer periods of time, then determine which of the applications for which data resources have been cached for the longer periods of time has the largest volume of cached data, and then to determine to release data resources of the application for which data resources have been cached for the longer periods of time. The data resources determined to be released can subsequently be released. As an example, in connection with determining which data resources to release, the terminal can first determine applications having larger volumes of cached data (e.g., volumes of cached data resources exceeding a threshold), then determine which of the applications having larger volumes of cached data have cached data resources for the longest time, and then determine to release data resources of the applications having larger volumes of cached data. The data resources determined to be released can subsequently be released. An amount of data resources to be released can be determined based at least in part on a volume of cached data resources in relation to one or more thresholds, or in relation to obtained data resources to be cached.

In some embodiments, cache management module 520 is configured to determine cache management levels. Cache management module 520 can determine cache management levels based at least in part on the network status (e.g., reported by network status reporting module 560), and/or the device running status (e.g., reported by device status reporting module 570). Cached data resources are managed and/or the caching operations (e.g., of the corresponding caching module) are controlled by implementing cache management strategies based at least in part on and corresponding to the determined cache management levels.

In some embodiments, cache management module 520 is configured to manage cached data resources and/or control the caching operations of the corresponding caching module based at least in part on one or more releasing operations. Three releasing operations are discussed below, however, other releasing operations can be implemented.

A first releasing operation: according to the first releasing operation, data resources for corresponding applications which has the first resource caching strategy are released. As an example, for all or some of the applications associated with (e.g., using) the first resource caching strategy to cache data resources, the data resources of those applications are released. The first resource caching strategy can be used in connection with caching data resources. The first resource caching strategy can correspond to a caching of all the data resources of the corresponding one or more applications.

A second releasing operation: according to the second releasing operation, data resources for corresponding applications are released. As an example, for all or some of the applications using the second resource caching strategy to cache data resources, the data resources of those applications are released. The second resource caching strategy can be used in connection with caching data resources. The second resource caching strategy can correspond to a caching of a portion (e.g., a subset) of the data resources of the corresponding one or more applications.

A third releasing operation: according to the third releasing operation, data resources for corresponding applications are released. As an example, for all or some of the applications using the third resource caching strategy to cache data resources, the data resources of those applications are released. The third resource caching strategy can be used in connection with caching initially received data resources of corresponding one or more applications. The third resource caching strategy can correspond to a caching of a portion (e.g., a subset) of the initially received data resources of the corresponding one or more applications.

In some embodiments, cache management module 520 controls caching operations by using one or more operations. Three operations are discussed below, however, other operations can be implemented.

Cache management module 520 can end or resume caching of data resources by first caching module 530. For example, cache management module 520 can instruct the first caching module 530 to end or resume caching of data resources. In response to a determination that caching of data resources is to be stopped, cache management module 520 can instruct the first caching module 530 to end caching of the data resources. In response to a determination that caching of data resources is to be resumed or started, cache management module 520 can instruct the first caching module 530 to resume or start caching of the data resources.

First caching module 530 can use the first resource caching strategy in connection with caching the data resources.

Cache management module 520 can end or resume caching of data resources by second caching module 540. For example, cache management module 520 can instruct the second caching module 540 to end or resume caching of data resources. In response to a determination that caching of data resources is to be stopped, cache management module 520 can instruct the second caching module 540 to end caching of the data resources. In response to a determination that caching of data resources is to be resumed or started, cache management module 520 can instruct the second caching module 540 to resume or start caching of the data resources. Second caching module 540 can use the second resource caching strategy in connection with caching the data resources.

Cache management module 520 can end or resume caching of data resources by third caching module 550. For example, cache management module 520 can instruct the third caching module 550 to end or resume caching of data resources. In response to a determination that caching of data resources is to be stopped, cache management module 520 can instruct the third caching module 550 to end caching of the data resources. In response to a determination that caching of data resources is to be resumed or started, cache management module 520 can instruct the third caching module 550 to resume or start caching of the data resources. Third caching module 550 can use the third resource caching strategy in connection with caching the data resources.

In some embodiments, cache management module 520 is configured to perform (or cause to perform, such as instructing another module to perform) one or more operations such as a releasing operation. Cache management module 520 can perform (or cause to perform) the first releasing operation in response to a determination that the cache management level corresponds to the highest level based at least in part on the network status (e.g., reported by network status reporting module 560), and/or the device running status (e.g., reported by device status reporting module 570). Cache management module 520 can determine whether the cache management level is the highest level after the first releasing operation is executed. Cache management module 520 can determine whether the cache management level is the highest level based at least in part on the network status (e.g., reported by network status reporting module 560), and/or the device running status (e.g., reported by device status reporting module 570). In response to determining that the cache management level corresponds to the highest level after the first releasing operation is executed, the cache management module 520 can perform (or cause to perform) the second releasing operation and/or the third releasing operation.

According to various embodiments, the cache management level is determined to correspond to the highest level when one or a combination of the following conditions is met: available capacity of device memory is less than a set threshold; device CPU occupancy is higher than a set threshold; uplink and/or downlink transmission rate is higher than a set threshold; and packet loss rate is lower than a set threshold.

The network status (e.g., reported by the network status reporting module 560) can comprise one or any combination of the following information: a network connection type (e.g., wired connection, wireless connection, WiFi, connection via a cellular network, etc.), uplink and/or downlink transmission rate (e.g., in relation to a set threshold), and a packet loss rate (e.g., in relation to a set threshold).

The device running status (e.g., reported by the device status reporting module 570) comprises one or any combination of the following information: available device memory capacity (e.g., in relation to one or more thresholds), and CPU occupancy.

Figure 6:
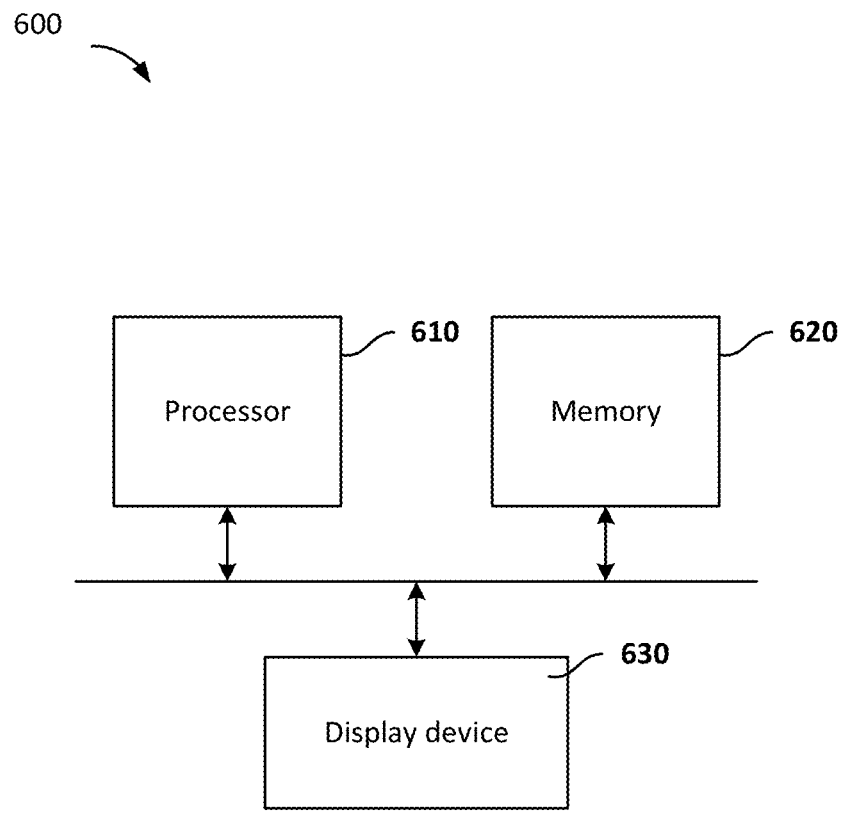
FIG. 6 is a structural diagram of a terminal for resource cache management according to various embodiments of the present application.

FIG. 6 is a structural diagram of a terminal for resource cache management according to various embodiments of the present application.

Referring to FIG. 6, terminal 600 is provided. Terminal 600 can implement at least part of process 200 of FIG. 2, interface 300 of FIG. 3A, and/or interface 350 of FIG. 3B. Terminal 600 can be implemented at least in part by system 100 of FIG. 1, system 400 of FIG. 4, system 500 of FIG. 5, and/or computer system 700 of FIG. 7.

As illustrated in FIG. 6, terminal 600 comprises: a processor 610 and memory 620. Terminal 600 can further comprise a display device 630.

Processor 610 can be a general processor (e.g., a microprocessor or any conventional processor), a digital signal processor, an application-specific integrated circuit, a field-programmable gate array or other programmable logic device, a discrete gate or transistor logic, or a discrete hardware component. Memory 620 specifically can comprise internal memory and/or external memory (e.g., random access memory, flash memory, read-only memory, programmable read-only memory, electrically erasable programmable memory, a register, or another mature storage medium in the art). Display device 630 can comprise a touchscreen control circuit.

Processor 610 can have data communication links with all other modules. For example, processor 610 can engage in data communication based on a bus architecture. The bus architecture may include any quantity of interconnected buses and bridges linking together one or more processors represented by processor 610 and various memory circuits represented by memory 620. The bus architecture can further link together various other circuits such as those of peripheral devices, voltage stabilizers, and power management circuits. All of these are known in the art and thus will not be described further herein. Interfaces are provided by bus interfaces. Processor 610 can manage bus architecture and general processing. Memory 620 can store the data used by the processor 610 when executing operations.

The data resource management process flow according to various embodiments can be applied to the processor 610 or implemented by the processor 610. During implementation, each step in the caching of data resources or releasing of cached data resources process flow can be completed by an integrated logic circuit of the hardware in the processor 610 or by a software instruction. Each method, step, and logic block disclosed by various embodiments of the present application can be thus implemented or executed. Steps of methods disclosed by various embodiments of the present application can be directly embodied as hardware and completed by the processor. Steps of methods disclosed by various embodiments of the present application can be completed by a combination of hardware and software modules in processor 610. A software module may be located in random access memory, flash memory, read-only memory, programmable read-only memory, electrically erasable programmable memory, a register, or another mature storage medium in the art.

In some embodiments, processor 610, coupled to the memory 620, is configured to read the computer program instructions stored by the memory 620 and, in response, to execute one or more of the following operations: obtaining (e.g., receiving) data resources, obtaining a resource caching strategy, and caching received data resources based on the resource caching strategy. Processor 610 can obtain a resource caching strategy based at least in part on and corresponding to the application to which the data resources belong. The resource caching strategies can be pre-allocated to applications, with the resource caching strategy allocated to one application being one of N resource caching strategies and N being an integer greater than 1.

In connection with processor 610 caching received data resources according to an obtained resource caching strategy, the pre-allocated data resource upper cache capacity limit can serve as a basis for determining whether the data volume of currently cached data resources has reached the upper cache capacity limit. If the data volume of currently cached data resources has not reached the upper cache capacity limit, the received data resources are cached according to the obtained resource caching strategy.

In some embodiments, if processor 610 determines the data volume of currently cached data resources has reached the upper cache capacity limit, then processor 610 will not cache obtained data resources (e.g., processor 610 will no longer cache received data resources). In some embodiments, if processor 610 determines the data volume of currently cached data resources has reached the upper cache capacity limit, then processor 610 will cache the received data resources according to the acquired resource caching strategy after releasing a portion of cached data resources. As an example, processor 610 can release cached data resources based at least in part on how long the corresponding cached data resources have been cached.

According to various embodiments, resource caching strategies can correspond to a first resource caching strategy, a second resource caching strategy, or a third resource caching strategy. Other caching strategies are possible.

First resource caching strategy: according to the first resource caching strategy, all data resources for the corresponding application are cached. For example, in response to obtaining data resources and determining that the first resource caching strategy is to be applied with respect to the obtained data resources, the obtained data resources are cached.

Second resource caching strategy: according to the second resource caching strategy, data resources of a designated portion of the application are cached. The second resource caching strategy can be used in connection with defining partial page content of a cached web page or one or a combination of public files used by a web page.

Third resource caching strategy: according to the third resource caching strategy, initially received data resources of the application following each start of the application are cached. For example, according to the third resource caching strategy, a preset amount of data resources obtained in response to launching the application is cached. The initially received data resources can be determined based on data resources that are obtained (e.g., communicated by the server) in response to a query for initial data resources that is sent upon (e.g., in response to) launch of the application.

In some embodiments, in response to the processor 610 obtaining a resource caching strategy based at least in part on and corresponding to the application to which the data resources belong, if the obtained resource caching strategy corresponds to the first resource caching strategy (e.g., in response to a determination that the obtained resource caching strategy is the first resource caching strategy), then processor 610 caches the received data resources. If in some embodiments, in response to the processor 610 obtaining a resource caching strategy based at least in part on and corresponding to the application to which the data resources belong, if the obtained resource caching strategy corresponds to the second resource caching strategy (e.g., in response to a determination that the obtained resource caching strategy is the second resource caching strategy), then processor 610 caches the received data resources if the received data resources are data resources of a designated portion of the associated application. In some embodiments, in response to the processor 610 obtaining a resource caching strategy based at least in part on and corresponding to the application to which the data resources belong, if the obtained resource caching strategy corresponds to the third resource caching strategy (e.g., in response to a determination that the obtained resource caching strategy is the third resource caching strategy), then processor 610 caches the received data resources if the received data resources correspond to the data resources initially received by the associated application.

In some embodiments, the second resource caching strategy is used in connection with defining partial page content of a cached web page or one or a combination of public files used by a web page.

In some embodiments, the data resource caching strategy corresponding to the application is allocated to the application based on one or a combination of: the application category, data resource consumption, and use frequency.

Processor 610 can update the data resource caching strategies corresponding to said applications based on status changes of the applications. The resource caching strategy corresponding to an application can be updated based at least in part on cache memory or a change to a size of cache memory. An example of an update to the data caching strategy can comprise changing a resource caching strategy from the first resource caching strategy to the second resource caching strategy. The resource caching strategy can be updated from the first resource caching strategy to the second resource caching strategy based on cache memory (e.g., in response to a determination that cache memory is decreased). A status change of an application can correspond to a change of whether the application is online or offline. For example, if an application changes from online to offline, the application caches the data resource to ensure that the application can function or otherwise use the data resource.

Processor 610 can manage cached data resources and/or control data resource caching operations based at least in part on pre-allocated cache management strategies, and obtained network statuses and/or device running statuses. The obtained network statuses can be determined according to a statistical analysis.

Processor 610 can obtain the application associated with the data resources which have been cached for the longest time and/or the application having the largest cached data volume. In connection with managing cached data resources, processor 610 prioritizes releasing data resources of the application associated with the data resources which have been cached for the longest time and/or the application having the largest cached data volume.

In connection with processor 610 managing cached data resources and/or controlling data resource caching operations according to pre-allocated cache management strategies and obtained network statuses and/or device running statuses, processor 610 can determine cache management levels according to obtained network statuses and/or device running statuses. Cached data resources can be managed and/or caching operations can be controlled by implementing cache management strategies based at least in part on and corresponding to the determined cache management levels.

In some embodiments, in connection with processor 610 managing cached data resources and/or controlling caching operations of the corresponding caching module, processor 610 can manage cached data resources and/or control the caching operations of the caching module according to one or more operations such as the first releasing operation, the second releasing operation, and/or the third releasing operation. Although the first releasing operation, the second releasing operation, and the third releasing operation are discussed below, other releasing operations are possible.

A first releasing operation: according to the first releasing operation, data resources for corresponding applications are released. As an example, for all or some of the applications associated with (e.g., using) the first resource caching strategy to cache data resources, the data resources of those applications are released. In some embodiments, the first releasing operation comprises releasing some or all of the data resources for corresponding applications. The first resource caching strategy can be used in connection with caching data resources. The first resource caching strategy can correspond to a caching of all the data resources of the corresponding one or more applications.

A second releasing operation: according to the second releasing operation, data resources for corresponding applications are released. As an example, for all or some of the applications using the second resource caching strategy to cache data resources, the data resources of those applications are released. The second resource caching strategy can be used in connection with caching data resources. The second resource caching strategy can correspond to a caching of a portion (e.g., a subset) of the data resources of the corresponding one or more applications.

A third releasing operation: according to the third releasing operation, data resources for corresponding applications are released. As an example, for all or some of the applications using the third resource caching strategy to cache data resources, the data resources of those applications are released. The third resource caching strategy can be used in connection with caching initially received data resources of corresponding one or more applications. The third resource caching strategy can correspond to a caching of a portion (e.g., a subset) of the initially received data resources of the corresponding one or more applications.

In some embodiments, controlling caching operations through one or a combination of the operations is performed. Three operations are discussed above, however, other operations can be implemented.

Processor 610 can end or resume caching of data resources. In response to a determination that caching of data resources is to be stopped, processor 610 can end caching of the data resources. In response to a determination that caching of data resources is to be resumed or started, processor 610 can resume or start caching of the data resources. Processor 610 can use the first resource caching strategy in connection with caching the data resource, the second resource caching strategy in connection with caching the data resource, and/or the third resource caching strategy in connection with caching the data resource.

In connection with processor 610 managing cached data resources, processor 610 executes the first releasing operation if the cache management level determined according to statistically obtained network status and/or device running status corresponds to the highest level. After processor 610 executes the first releasing operation, processor 610 can determine whether the cache management level corresponds to the highest level based at least in part on the acquired network status and/or acquired device running status. If processor 610 determines that the cache management level corresponds to the highest level (e.g., remains at the highest level after executing the first releasing operation), then processor 610 can execute the second releasing operation and/or the third releasing operation.

In some embodiments, the cache management level corresponds to the highest level when one or a combination of the following conditions is met: an available capacity of device memory is less than a set threshold; a device CPU occupancy is higher than a set threshold; an uplink and/or a downlink transmission rate is higher than a set threshold; and a packet loss rate is lower than a set threshold. Various other conditions can be used in connection with determining that the cache management level corresponds to the highest level.

In some embodiments, the statistically obtained network status comprises one or any combination of the following information: a network connection type, an uplink and/or a downlink transmission rate, and a packet loss rate.

The statistically obtained device running status can comprise one or any combination of the following information: an available device memory capacity, and a CPU occupancy.

Various embodiments improve running performance. Particularly in situations in which the terminal is connected to the Internet, Internet applications can use cached data resources. The Because the memory capacity of the terminal is limited, if a large number of Internet applications caching all their data, the memory overhead of the terminal can be too large, which affects the operating efficiency of the Internet application, cannot achieve the purpose of improving the user experience, and even leads to the Internet application being not available. In addition, various embodiments support multiple resource caching strategies (e.g., full caching, partial caching, etc.) and support dynamic adjustments to caching (e.g., releasing cached data resources) based on network status, device memory/CPU status, etc. Various embodiments can thus maximally balance performance and memory use.

Figure 7:
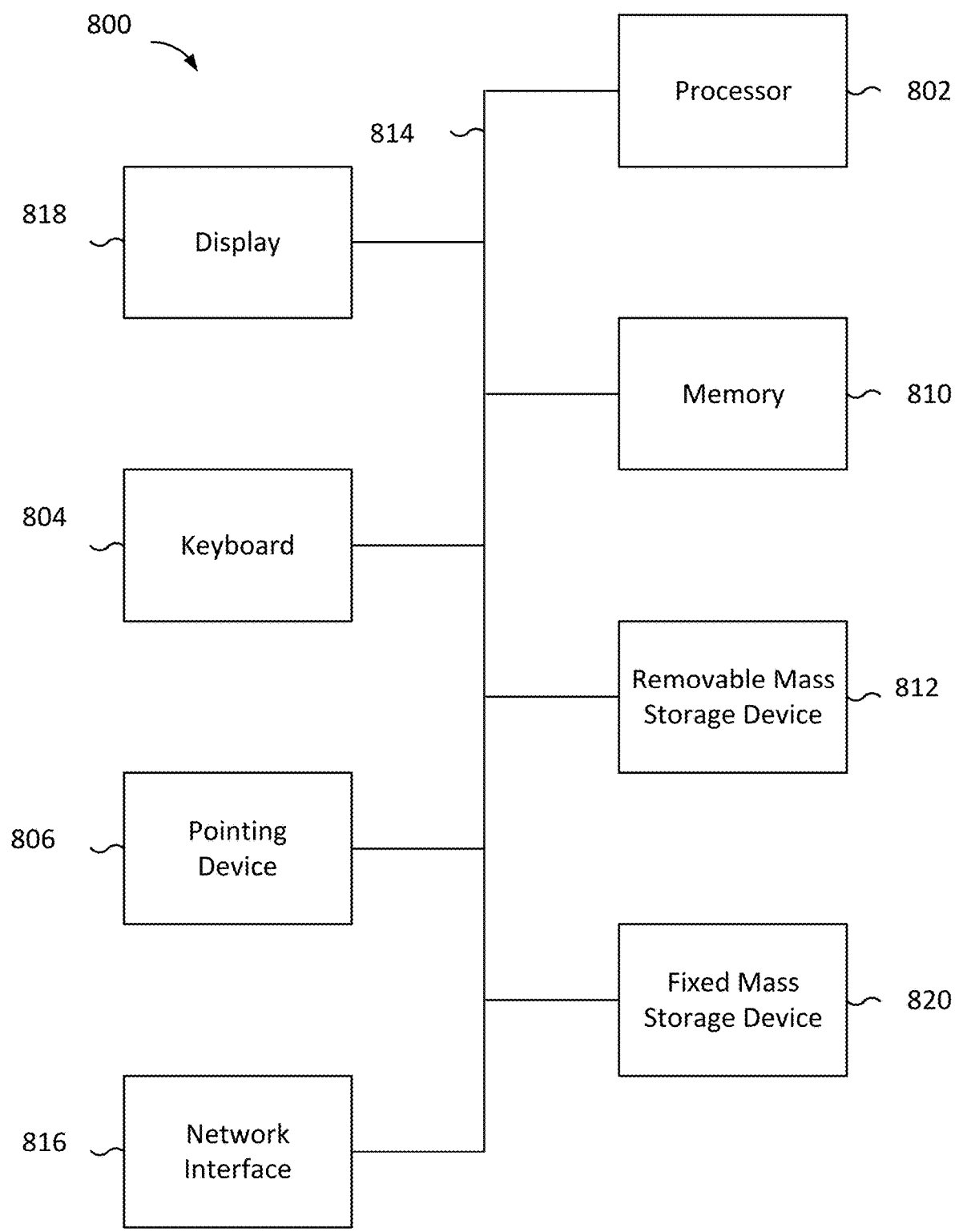
FIG. 7 is a functional diagram of a computer system for resource cache management according to various embodiments of the present application.

FIG. 7 is a functional diagram of a computer system for resource cache management according to various embodiments of the present application.

Referring to FIG. 7, computer system 700 is provided. Computer system 700 can implement at least part of system 100 of FIG. 1. Computer system 700 can implement process 200 of FIG. 2, interface 300 of FIG. 3A, interface 350 of FIG. 3B, at least part of system 400 of FIG. 4, at least part of system 500 of FIG. 5, and at least part of terminal 600 of FIG. 6.

Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown). The memory can be a non-transitory computer-readable storage medium.

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage device 712 and fixed mass storage 720 generally store additional programming instructions, data, and the like that typically are not in active use by the processor 702. It will be appreciated that the information retained within mass storage device 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

The present application is described with reference to flowcharts and/or block diagrams based on methods, devices (systems), and computer program products of embodiments of the present application. Please note that each process flow and/or block within the flowcharts and/or block diagrams and combinations of process flows and/or blocks within the flowcharts and/or block diagrams can be realized by computer commands. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command means. These command means implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more process flows in a flow chart and/or one or more blocks in a block diagram.

Although preferred embodiments of the present application have already been described, persons skilled in the art can make other alterations and modifications to these embodiments once they grasp the basic creative concept. Therefore, the attached claims are to be interpreted as including the preferred embodiments as well as all alterations and modifications falling within the scope of the present application.

Obviously, a person skilled in the art can modify and vary the present application without departing from the spirit and scope of the present application. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A resource cache management method, characterized in that it comprises:
obtaining data resources wherein:
the data resources correspond to an application installed on a terminal;
the data resources are sent by a server to the terminal in response to a determination that one or more criteria are satisfied; and
the one or more criteria pertain to one or more contexts of the terminal or the application;
obtaining a resource caching strategy based at least in part on a mapping of one or more resource caching strategies to one or more categories or types of applications installed on the terminal or to a use frequency of one or more applications installed on the terminal, and the application to which the data resources belong, wherein:
the obtaining the resource caching strategy comprises:
determining a category or type of application to which the application corresponds, or the use frequency to which the application corresponds, or both; and
performing a lookup of the resource caching strategy based at least in part on the mapping using the category or type of the application, or the use frequency of the application, or both; and
caching the obtained data resources based at least in part on the obtained resource caching strategy, the obtained data resources being cached locally at the terminal.

2. The method of claim 1, wherein the one or more resource caching strategies are pre-allocated to one or more applications installed on the terminal.

3. The method of claim 2, wherein the terminal stores the mapping of the one or more resource caching strategies to the one or more applications installed on the terminal.

4. The method of claim 1, wherein the resource caching strategy allocated to the application is one of N resource caching strategies, N being an integer greater than 1.

5. The method of claim 1, wherein the caching the obtained data resources based at least in part on the obtained resource caching strategy comprises:
determining whether a data volume of currently cached data resources exceeds an upper cache capacity limit; and
in response to a determination that the data volume of the currently cached data resources does not exceed the upper cache capacity limit, caching the obtained data resources based at least in part on the obtained resource caching strategy.

6. The method of claim 5, further comprising:
in response to a determination that the data volume of the currently cached data resources exceeds the upper cache capacity limit:
ceasing caching the obtained data resources; or
caching the obtained data resources based at least in part on the resource caching strategy after a portion of the currently cached data resources is released based at least in part on a length of time for which the data resources have been cached.

7. The method of claim 6, further comprising: determining the portion of the currently cached data resources to release based at least in part on how long the corresponding data resources have been cached.

8. The method of claim 1, wherein the resource caching strategy corresponding to the application comprises one or more of:
a first resource caching strategy according to which all the data resources of the application are cached;
a second resource caching strategy according to which a subset of the data resources of the application are cached; and
a third resource caching strategy according to which initially received data resources of the application are cached.

9. The method of claim 8, wherein the obtaining the resource caching strategy based at least in part on the application to which the data resources belong comprises:
in response to a determination that the obtained resource caching strategy corresponds to the first resource caching strategy, caching the obtained data resources;
in response to a determination that the obtained resource caching strategy corresponds to the second resource caching strategy, caching the obtained data resources in response to a determination that the obtained data resources correspond to a designated portion of the application; and
in response to a determination that the obtained resource caching strategy corresponds to the third resource caching strategy, caching the obtained data resources in response to a determination that the obtained data resources correspond to the data resources initially received by the associated application.

10. The method of claim 9, wherein the second resource caching strategy is used in connection with defining partial page content of a cached web page or one or a combination of public files used by a web page.

11. The method of claim 1, wherein the resource caching strategy corresponding to the application is allocated to the application based on one or a combination of: an application category corresponding to the application, a data resource consumption, and a use frequency.

12. The method of claim 1, further comprising:
managing cached data resources and/or controlling data resource caching operations based at least in part on one or more pre-allocated cache management strategies, and an obtained network status, a device running status, or both the obtained network status and the device running status.

13. The method of claim 12, further comprising:
determining an application associated with data resources that have been cached for a longest time and/or an application having a largest cached data volume; and
in connection with managing the cached data resources, releasing data resources according to a priority of releasing data resources, data resources of the application associated with the data resources that have been cached for the longest time and/or the application having the largest cached data volume are associated with a higher priority for releasing the data resources.

14. The method of claim 12, wherein the managing the cached data resources and/or controlling the data resource caching operations comprises:

determining a cache management level based at least in part on the obtained network status, the device running status, or both the obtained network status and the device running status; and managing cached data resources and/or controlling caching operations by implementing a cache management strategy based at least in part on the determined cache management levels.

15. The method of claim 12, wherein managing the cached data resources comprises managing the cached data resources according to one or more of:

a first releasing operation according to which data resources of applications that use a first resource caching strategy to cache data resources are released, the first resource caching strategy corresponding to a strategy in which all data resources of a corresponding application are cached;

a second releasing operation according to which data resources of applications that use a second resource caching strategy to cache data resources are released, the second resource caching strategy corresponding to a strategy in which a subset of data resources of a corresponding application are cached; and a third releasing operation according to which data resources of applications that use a third resource caching strategy to cache data resources are released, the third resource caching strategy corresponding to a strategy in which initially received data resources of the application are cached.

16. The method of claim 15, wherein the managing of the cached data resources comprises:

in response to a determination that a cache management level corresponds to a highest level based at least in part on the obtained network status and/or the device running status:

executing the first releasing operation;

in response to executing the first releasing operation, determining whether the cache management level corresponds to the highest level according to the obtained network status and/or the device running status; and in response to determining whether the cache management level corresponds to the highest level after executing the first releasing operation, executing the second releasing operation and/or the third releasing operation.

17. The method of claim 16, wherein the cache management level is determined to be the highest level in response to determining that one or more of the following conditions are satisfied:

an available capacity of device memory is less than a set threshold;

a device CPU occupancy is higher than a set threshold;

an uplink and/or a downlink transmission rate is higher than a set threshold; and a packet loss rate is lower than a set threshold.

18. The method as described claim 12, wherein controlling the caching operations comprises:

ending or resuming use of one or more of a first resource caching strategy to cache data resources, a second caching strategy to cache data resources, and a third resource caching strategy to cache data resources.

19. The method of claim 12, wherein the obtained network status comprises one or any combination of a network connection type, an uplink and/or a downlink transmission rate, and a packet loss rate.

20. The method of claim 12, wherein the device running status comprises an available device memory capacity, a CPU occupancy, or both.

21. The method of claim 1, wherein:

the one or more resource caching strategies are pre-defined; and a plurality of applications installed on the terminal are pre-allocated to one of the one or more resource caching strategies.

22. The method of claim 1, further comprising:

updating an allocation of the application to allocate the application to a different resource strategy based at least in part on a change in status of the application.

23. A terminal, characterized in that it comprises:

one or more processors configured to:

obtain data resources wherein:

the data resources correspond to an application installed on the terminal;

the data resources are sent by a server to the terminal in response to a determination that one or more criteria are satisfied; and the one or more criteria pertain to one or more contexts of the terminal or the application;

obtain a resource caching strategy based at least in part on a mapping of one or more resource caching strategies to one or more categories or types of applications installed on the terminal or to a use frequency of one or more applications installed on the terminal, and the application to which the data resources belong wherein:

to obtain the resource caching strategy comprises:

determining a category or type of application to which the application corresponds or the use frequency to which the application corresponds, or both; and performing a lookup of the resource caching strategy based at least in part on the mapping using the category or type of the application or the use frequency of the application, or both; and cache the obtained data resources based at least in part on the obtained resource caching strategy, the obtained data resources being cached locally at the terminal; and one or more memories coupled to the one or more processors, configured to provide the one or more processors with instructions.

24. A computer program product, the computer program product being embodied in a non-transitory computer readable storage medium and comprising computer instructions for:

obtaining data resources wherein:

the data resources correspond to an application installed on a terminal;

the data resources are sent by a server to the terminal in response to a determination that one or more criteria are satisfied; and the one or more criteria pertain to one or more contexts of the terminal or the application;

obtaining a resource caching strategy based at least in part on a mapping of one or more resource caching strategies to one or more categories or types of applications installed on the terminal or to a use frequency of one or more applications installed on the terminal and the application to which the data resources belong wherein:

the obtaining the resource caching strategy comprises:

determining a category or type of application to which the application corresponds or the use frequency to which the application corresponds, or both; and performing a lookup of the resource caching strategy based at least in part on the mapping using the category or type of the application or the use frequency of the application, or both; and caching the obtained data resources based at least in part on the obtained resource caching strategy, the obtained data resources being cached locally at the terminal.

* * * * *

UNITED STATES PATENT AND TRADEMARK OFFICE
CERTIFICATE OF CORRECTION

PATENT NO. : 10,862,992 B2
APPLICATION NO. : 16/041079
DATED : December 8, 2020
INVENTOR(S) : Fengyuan Wu et al.

Page 1 of 1

It is certified that error appears in the above-identified patent and that said Letters Patent is hereby corrected as shown below:

On the Title Page

Item (73), assignee, country, insert --(KY)--.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*